United States Patent

Colberg

[11] Patent Number: 4,652,632
[45] Date of Patent: Mar. 24, 1987

[54] NAPHTHOLAZO BENZOYLALKYLENE AMINES AND SALTS THEREOF AS DYES FOR ACID-MODIFIED FIBERS, LEATHER AND PAPER

[75] Inventor: Horst Colberg, Schifferstadt, Fed. Rep. of Germany

[73] Assignee: BASF Aktiengesellschaft, Ludwigshafen, Fed. Rep. of Germany

[21] Appl. No.: 718,277

[22] Filed: Apr. 1, 1985

[30] Foreign Application Priority Data

Apr. 6, 1984 [DE] Fed. Rep. of Germany ....... 3413022

[51] Int. Cl.$^4$ ............... C09B 29/02; C09B 29/033; C09B 29/036; C09B 29/15
[52] U.S. Cl. .................................. 534/728; 106/23; 106/288 Q; 106/308 Q; 162/162; 534/603; 534/604; 534/612; 534/615; 534/649; 534/693
[58] Field of Search ............ 534/603, 604, 612, 615, 534/728, 693, 649, 613, 573

[56] References Cited

U.S. PATENT DOCUMENTS 2,219,280  10/1940  Graenacher et al. ............... 534/612
3,694,426  10/1969  Doss ..................... 534/612

FOREIGN PATENT DOCUMENTS 1169603  12/1956  France ................. 534/615

Primary Examiner—Floyd D. Higel
Attorney, Agent, or Firm—Oblon, Fisher, Spivak, McClelland & Maier

[57] ABSTRACT

Naphtholazo benzoylalkylene amines and salts thereof which are useful as dyes for acid-modified fibers, leather and paper, and which are represented by the formula

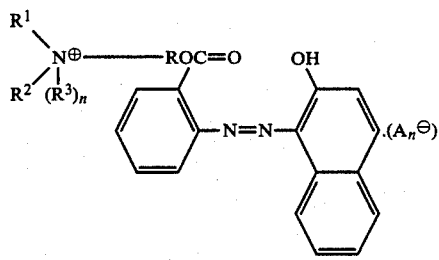

wherein
n is 0 or 1,
A is an anion,
R is $C_2$- to $C_4$-alkylene
$R^1$ and $R^2$ independently of one another are $C_1$- to $C_4$-alkyl, methoxyethyl, cyclohexyl, and $R^1$ and $R^2$ together are

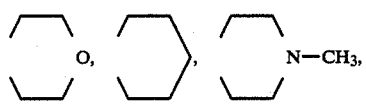

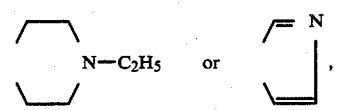

and
$R^3$ is methyl, ethyl or hydroxyethyl.

3 Claims, No Drawings

NAPHTHOLAZO BENZOYLALKYLENE AMINES AND SALTS THEREOF AS DYES FOR ACID-MODIFIED FIBERS, LEATHER AND PAPER

The present invention relates to compounds of the general formula I

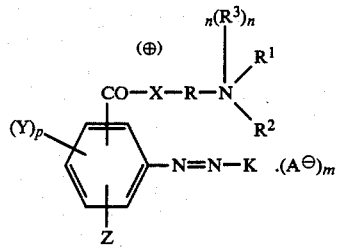

where Y is hydrogen, chlorine, bromine or nitro, Z is hydrogen, chlorine, bromine, a sulfonic acid ester group or unsubstituted or substituted sulfamyl, X is —O— or

R is alkylene which may or may not be interrupted by oxygen or

m is 1 or 2, n is 0 or 1, p is 1 or 2, $R^1$ and $R^2$ independently of one another are each hydrogen, unsubstituted or substituted alkyl, alkenyl, cycloalkyl, aralkyl or aryl, or $R^1$ and $R^2$ together with the nitrogen form a heterocyclic structure, $R^3$ is hydrogen or unsubstituted or substituted alkyl, K is a radical of a coupling component of the naphthol series, $A^\ominus$ is an anion, $R^4$ is unsubstituted or substituted alkyl and $R^5$ is hydrogen or $C_1$–$C_4$-alkyl, and the radical

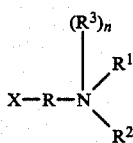

may furthermore be an unsubstituted or substituted piperazine radical.

Specific examples of radicals Z, in addition to those stated above, are $SO_2NH_2$, $SO_2NHCH_3$, $SO_2NHC_2H_5$, $SO_2NHC_3H_7$, $SO_2NHC_4H_9$, $SO_2NHC_6H_5$, $SO_2N(CH_3)_2$, $SO_2N(C_2H_5)_2$, $SO_2N(C_3H_7)_2$, $SO_2N(C_4H_9)_2$, $SO_2NHC_2H_4OH$,

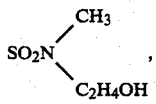

$SO_2N(C_2H_4OH)_2$, $SO_2OCH_2CH_2N(CH_3)_2$, $SO_2OC_2H_4N(C_2H_5)_2$, $SO_2OC_2H_4N(C_4H_9)_2$, $SO_2OC_2H_4N(CH_2CH_2)_2O$, $SO_2OCH(CH_3)CH_2N(CH_3)_2$, $SO_2OCH(CH_3)CH_2N(C_2H_5)_2$, $SO_2OC_4H_8N(CH_3)_2$ and $SO_2OC_4H_8N(C_2H_5)_2$.

Z is particularly preferably hydrogen, chlorine or bromine.

Unsubstituted or substituted alkylene radicals R are of, for example, 2 to 10 carbon atoms, $C_2$ to $C_3$ radicals being preferred.

Specific examples are:

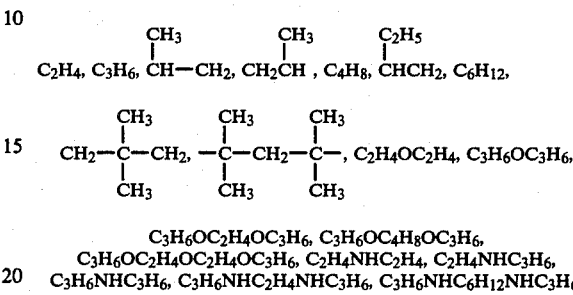

$C_3H_6OC_2H_4OC_3H_6$, $C_3H_6OC_4H_8OC_3H_6$, $C_3H_6OC_2H_4OC_2H_4OC_3H_6$, $C_2H_4NHC_2H_4$, $C_2H_4NHC_3H_6$, $C_3H_6NHC_3H_6$, $C_3H_6NHC_2H_4NHC_3H_6$, $C_3H_6NHC_6H_{12}NHC_3H_6$,

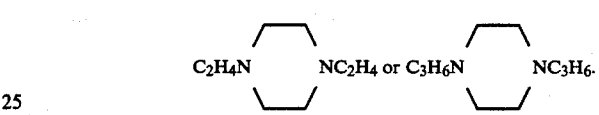

As a rule, alkyl radicals $R^1$ and $R^2$ are of 1 to 14 carbon atoms and can be substituted by, for example, N-cycloalkylamino, N,N-di-$C_1$–$C_5$-alkylamino, hydroxyl or $C_1$–$C_8$-alkoxy. Other examples of radicals $R^1$ and $R^2$ are allyl, methallyl and $C_5$–$C_8$-cycloalkyl.

Specific examples in addition to the radicals stated above are the following radicals: methyl, ethyl, n-propyl, isopropyl, n-butyl, isobutyl, n-amyl, isoamyl, n-hexyl, isohexyl, heptyl, octyl, 2-ethylhexyl, decyl, dodecyl, tridecyl, tetradecyl, 2-hydroxyethyl, 2- and 3-hydroxypropyl, hydroxybutyl, cyclopentyl, cyclohexyl and cyclooctyl, N,N-dimethylaminoethyl, N,N-diethylaminoethyl, N,N-dipropylaminoethyl, N,N-dibutylaminoethyl, 3-(N,N-dimethylamino)-propyl, 3-(N,N-diethylamino)-propyl, 3-(N,N-dipropylamino)-propyl and 3-(N,N-dibutylamino)-propyl, N-cyclohexylaminoethyl, 3-(N-cyclohexylamino)-propyl, 3-(N-cyclooctylamino)-propyl, N-methyl-N-cyclohexylaminoethyl, 3-(N-methyl-N-cyclohexylamino)-propyl, benzyl, phenethyl, phenyl and tolyl.

$R^1$ and $R^2$, together with the nitrogen, can form, for example, radicals of the following heterocyclic compounds: pyrrolidine, piperidine, morpholine, piperazine which can be substituted at the nitrogen by methyl, ethyl, n- and isopropyl, n-, iso- and sec.-butyl, 2-hydroxyethyl, 2-aminoethyl, 2- or 3-hydroxypropyl or 2- or 3-aminopropyl, imidazole which can be substituted in the 2- and/or 4-positions by methyl, ethyl, propyl or butyl, and 3-($C_1$–$C_{12}$-alkyl)-and vinylimidazole which can be further substituted in the 2- and/or 4-positions by methyl, ethyl, propyl or butyl.

The radical

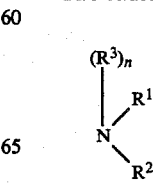

may furthermore be a group of the formula

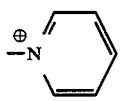

Other examples of suitable radicals $R^3$ are $C_1$–$C_{12}$-alkyl and $C_2$–$C_4$-hydroxyalkyl, such as methyl, ethyl, n- or isopropyl, n- or isobutyl, n- or isoamyl, n- or isohexyl, octyl, 2-ethylhexyl, decyl, dodecyl, 2-hydroxyethyl, 2- or 3-hydroxypropyl, hydroxybutyl or $CH_2CH(OH)CH_2OH$, and benzyl and $CH_2CH_2(OH)CH_2Cl$.

$R^3$ is preferably $C_1$–$C_4$-alkyl, $C_2$–$C_4$-hydroxyalkyl or benzyl, particularly preferably methyl, ethyl or $C_2$- or $C_3$-hydroxyalkyl.

$R^4$ is preferably $CH_3$, $C_2H_5$ or $C_2H_4OH$.

Examples of coupling components K are α-naphthol, naphthalenediols, chloronaphthols, alkylnaphthols and, in particular, β-naphthol.

Examples of anions $A^\ominus$ are chloride, bromide, hydrogen sulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate and dodecylbenzenesulfonate.

The compounds of the formula I can be prepared, for example, by diazotizing an amine of the formula

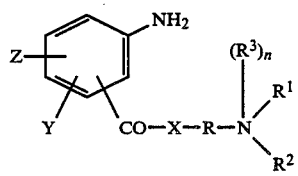

and reacting the product with a coupling component of the formula

H—K

The examples which follow illustrate the preparation.

The compounds of the formula I are useful for dyeing acid-modified fibers such as polyacrylonitrile or polyesters, leather and, in particular, paper. In particular, it is also possible to print paper with printing inks containing aqueous solutions of addition salts of I with acids. In the form of the bases or of salts with relatively long-chain carboxylic or sulfonic acids, such as oleic acid or dodecylbenzenesulfonic acid, they are also suitable, for example, for pastes for ballpoint pens, as solvent dyes or for non-aqueous printing inks. In the form of acid addition salts with appropriate anions, the dyes are furthermore readily soluble in water and organic solvents, so that they are useful for the preparation of liquid concentrates.

Of particular importance are compounds of the formula Ia

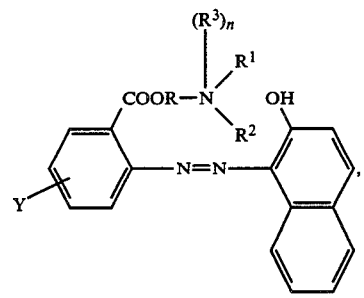

where R, $R^1$, $R^2$, $R^3$ and Y have the stated meanings.

Y is preferably hydrogen or nitro, R is preferably $C_2H_4$, $C_3H_6$, —$CH(CH_3)CH_2$ or $C_4H_8$, $R^1$ and $R^2$ are each preferably H, $CH_3$, $C_2H_5$, n- or i-$C_3H_7$, n-, i- or sec-$C_4H_9$, $C_2H_4OCH_3$,

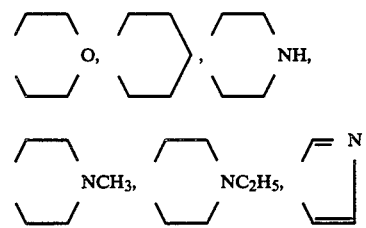

or cyclohexyl, and $R^3$ is preferably $CH_3$, $C_2H_5$ or $C_2H_4OH$.

In the examples below, parts and percentages are by weight, unless stated otherwise.

EXAMPLE 1

Preparation of the Diazo Component 187 parts of dimethylaminoethanol are added dropwise to 326 parts of isatoic anhydride in 1,000 parts of dioxane at 60° C., stirring is continued for 1 hour, the mixture is evaporated down under reduced pressure from a water pump, and the residue is distilled under greatly reduced pressure. 402 parts of 2′-dimethylaminoethyl anthranilate pass over at 160° C./0.1 mm Hg.

23.6 parts of the above product are dissolved in a mixture of 125 parts of water, 125 parts of glacial acetic acid and 50 parts of concentrated hydrochloric acid, the solution is cooled to 5° C., and 34.5 parts of a 23% strength aqueous solution of sodium nitrite are then added dropwise. After 3 hours, excess nitrite is destroyed by adding amidosulfonic acid.

14.4 parts of 2-naphthol are dissolved in a warm mixture of 50 parts of 2N sodium hydroxide solution and 150 parts of water, and the mixture is added to the diazonium salt solution at room temperature. To effect coupling, the pH is brought to 4 with ammonia water. The mixture is stirred overnight, after which the product is filtered off under suction, washed with water, pressed thoroughly and dried in an oven to give 21 parts of a pale red powder. The dye can be dissolved in glacial acetic acid and water to give a stable 20% strength liquid formulation. It dyes paper stock brilliant orange, the effluent being only slightly colored. The colored papers can be bleached with hydrosulfite. The compound is of the formula

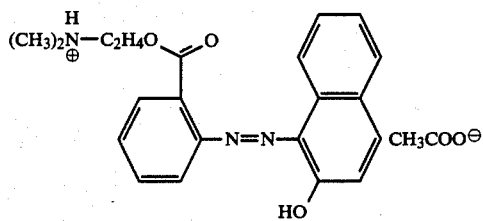

Other dyes whose hue and affinity for paper stock are substantially the same as that of Example 1 can be prepared by a method similar to that described.

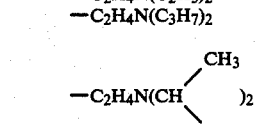

| Example No. | —R—NR$^1$R$^2$ |
|---|---|
| 2 | —C$_2$H$_4$N(CH$_3$)$_2$ |
| 3 | —C$_2$H$_4$N(C$_2$H$_5$)$_2$ |
| 4 | —C$_2$H$_4$N(C$_3$H$_7$)$_2$ |
| 5 | —C$_2$H$_4$N(CH(CH$_3$)$_2$)$_2$ |
| 6 | —C$_2$H$_4$N(C$_4$H$_9$)$_2$ |
| 7 | —C$_2$H$_4$N(CH$_2$CH—CH$_3$)$_2$<br>　　　　　　　　CH$_3$ |
| 8 | —C$_2$H$_4$N(CH—C$_2$H$_5$)$_2$<br>　　　　　　　CH$_3$ |
| 9 | —C$_2$H$_4$NHCH$_3$ |
| 10 | —C$_2$H$_4$NHC$_2$H$_5$ |
| 11 | —C$_2$H$_4$N⟨(CH$_2$)$_5$⟩ |
| 12 | —C$_2$H$_4$N⟨(CH$_2$)$_6$⟩ |
| 13 | —C$_2$H$_4$N(morpholino, O) |
| 14 | —C$_2$H$_4$N(piperazino, NH) |
| 15 | —C$_2$H$_4$N(N-methylpiperazino, N—CH$_3$) |

-continued

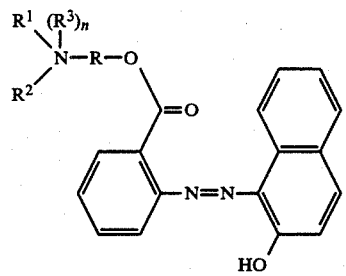

| Example No. | —R—NR$^1$R$^2$ |
|---|---|
| 16 | —C$_2$H$_4$N(piperazino)N—C$_2$H$_5$ |
| 17 | —C$_2$H$_4$NH—(cyclohexyl, H) |
| 18 | —C$_2$H$_4$N(imidazolyl) |
| 19 | —C$_2$H$_4$N(C$_2$H$_4$OCH$_3$)$_2$ |
| 20 | —C$_2$H$_4$N(C$_2$H$_4$OC$_2$H$_5$)$_2$ |
| 21 | —CH—CH$_2$—N(CH$_3$)$_2$<br>　CH$_3$ |
| 22 | —CH—CH$_2$—N(C$_2$H$_5$)$_2$<br>　CH$_3$ |
| 23 | —CH—CH$_2$—N(C$_3$H$_7$)$_2$<br>　CH$_3$ |
| 24 | —CH—CH$_2$—N(CH—CH$_3$)$_2$<br>　CH$_3$　　　　CH$_3$ |
| 25 | —CH—CH$_2$—N(C$_4$H$_9$)$_2$<br>　CH$_3$ |
| 26 | —CH—CH$_2$—N(CH$_2$—CH—CH$_3$)$_2$<br>　CH$_3$　　　　　　　CH$_3$ |
| 27 | —CH—CH$_2$—N(CHCH$_2$CH$_2$)$_2$<br>　CH$_3$　　　　　CH$_3$ |
| 28 | —CH—CH$_2$NHCH$_3$<br>　CH$_3$ |
| 29 | —CH—CH$_2$—NHC$_2$H$_5$<br>　CH$_3$ |
| 30 | —CH—CH$_2$—N(morpholino, O)<br>　CH$_3$ |

-continued

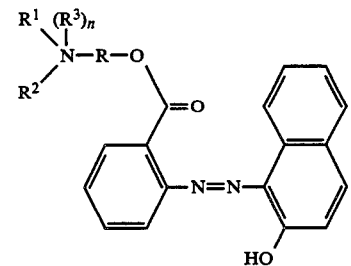

| Example No. | —R—NR¹R² |
|---|---|
| 31 | —CH(CH₃)—CH₂—N(piperazine-NH) |
| 32 | —CH(CH₃)—CH₂—N(piperazine-NCH₃) |
| 33 | —CH(CH₃)—CH₂—N(piperazine-NC₂H₅) |
| 34 | —CH(CH₃)—CH₂—NH—cyclohexyl (H) |
| 35 | —CH(CH₃)CH₂N(imidazole) |
| 36 | —CH(CH₃)—CH₂N(C₂H₄OCH₃)₂ |
| 37 | —C₃H₆N(CH₃)₂ |
| 38 | —C₃H₆N(C₂H₅)₂ |
| 39 | —C₃H₆N(morpholine, O) |
| 40 | —C₃H₆N(piperazine, NH) |
| 41 | —C₃H₆N(piperazine, N—CH₃) |
| 42 | —CH₂CH(C₂H₅)—N(CH₃)₂ |
| 43 | —CH₂CH(C₂H₅)—N(C₂H₅)₂ |

-continued

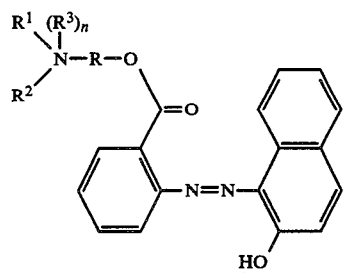

| Example No. | —R—NR¹R² |
|---|---|
| 44 | —CH₂CH(C₂H₅)—N(C₃H₆)₂ |
| 45 | —CH₂CH(C₂H₅)—N(morpholine, O) |
| 46 | —CH₂CH(C₂H₅)—N(piperazine, NH) |
| 47 | —CH₂CH(C₂H₅)—N(piperazine, NCH₃) |
| 48 | —C₄H₈—N(CH₃)₂ |
| 49 | —C₄H₈—N(C₂H₅)₂ |
| 50 | —C₄H₈—N(C₃H₆)₂ |
| 51 | —C₄H₈—N(morpholine, O) |
| 52 | —C₄H₈—N(piperazine, NH) |
| 53 | —C₄H₈—N(piperazine, NCH₃) |

Other dyes which dye paper brilliant orange can be prepared from the corresponding halogenated or sulfochlorinated derivatives of isatoic anhydride by a method similar to that of Example 1.

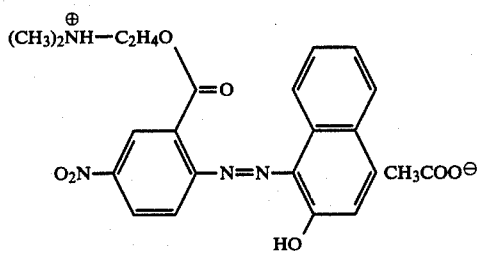

| Example No. | COOR–N(R¹)(R²)(R³)ₙ | Y | Z |
|---|---|---|---|
| 54 | COOC₂H₄N(CH₃)₂ | 5-Cl | H |
| 55 | COOC₂H₄N⟨O⟩ (morpholino) | 5-Cl | H |
| 56 | COOC₂H₄N(CH₃)₂ | 5-Br | H |
| 57 | COOC₂H₄N⟨O⟩ (morpholino) | 5-Br | H |
| 58 | COOC₂H₄N(CH₃)₂ | 3-Cl | 5-Br |
| 59 | COOC₂H₄N(CH₃)₂ | 5-Br | 3-Cl |
| 60 | COOC₂H₄N(CH₃)₂ | H | 5-SO₂OC₂H₄N(CH₃)₂ |

EXAMPLE 61

Diazo Component 187.2 parts of 5-nitroisatoic anhydride are introduced into a mixture of 600 parts of dioxane and 85 parts of N,N-dimethylethanolamine at 60° C. When the evolution of gas has ceased, the mixture is cooled to room temperature and filtered, the filtrate is stirred into a large amount of water, and the precipitate is filtered off under suction and dried. The yield is 125 parts. After recrystallization from aqueous ethanol, the product gives the following elemental analysis, the stated values being percentages:

$C_{11}H_{15}O_4N_3$: calculated: C, 52.2; H, 6.0; O, 25.3; N, 16.6; found: C, 51.6; H, 5.6; O, 26.5; N, 16.3.

The diazotization equivalent is 261 g/equivalent (theoretical value 253 g/equivalent).

Diazotization and coupling to β-naphthol as described in Example 1 give a dye which dyes paper stock red when used in an aqueous solution containing acetic acid. In acidic solution, the compound is of the formula

[Structure: (CH₃)₂NH⊕—C₂H₄O—C(=O)—(phenyl with O₂N)—N=N—(naphthyl with HO); CH₃COO⊖]

The red dyes below can be prepared by a method similar to that of Example 61, using other amino alcohols.

[Structure: R²(R³)ₙR¹N—R—O—C(=O)—(phenyl with O₂N)—N=N—(naphthyl with HO)]

| Example No. | COORN(R¹)(R²)(R³)ₙ |
|---|---|
| 62 | COOC₂H₄N⟨O⟩ (morpholino) |
| 63 | COOC₂H₄N(C₂H₅)₂ |
| 64 | COOC₂H₄N⟨N—CH₃⟩ (N-methylpiperazino) |

EXAMPLE 65

Preparation of the Diazo Component

The diazo component prepared as described in Example 1 is distilled. 13 g of dimethyl sulfate are added dropwise to 21 parts of the distilled product in 100 parts of toluene at 60° C., stirring is continued for one hour at this temperature, the mixture is cooled to room temperature, and the precipitate is filtered off under suction. After drying, the diazotization equivalent is 355 g/equivalent (theoretical value 334 g/equivalent). The compound is of the formula

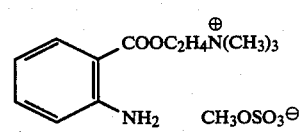

After diazotization and coupling as described in Example 1, the solution is rendered alkaline with sodium hydroxide solution, the aqueous phase is decanted from the greasy dye, and the latter is dissolved in aqueous glacial acetic acid. The dye dyes paper stock brilliant orange with moderate coloration of the effluent. In this form, the dye is of the formula

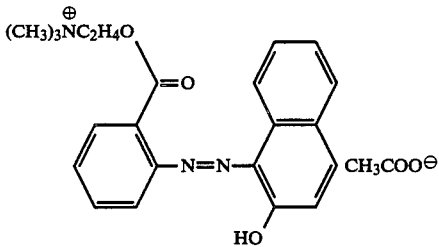

EXAMPLE 66

2 parts of a 10 percent strength solution of the dye from Example 1 in acetic acid are added to a suspension of 50 parts of bleached sulfate pulp of about 30° SR in 2,000 parts of water at pH 7. The mixture is stirred for 15 minutes at from 20° to 25° C., after which it is diluted to a solids content of 0.2% with water. Paper sheets are produced with this suspension on a laboratory sheet-forming apparatus, and the sheets are dried for 5 minutes at 100° C. Orange sheets are obtained. The effluent is moderately colored, and the fastness to bleeding with respect to water, aqueous sodium carbonate solution and acetic acid is good. If, instead of bleached pulp, mechanical pulp is used, the effluent is only slightly colored and the fastness to bleeding is good or very good.

When the dyes from Examples 2 to 65 are used, similar dyeing results are obtained.

EXAMPLE 67

1.0 part of a product obtained by milling 90% of the dye described in Example 1 with 10% of amidosulfonic acid was sprinkled into a stirred suspension of 100 parts of a mixture of 70% of bleached pine sulfate pulp and 30% of bleached birch sulfate pulp in 2,000 parts of water, the total stock being of about 30° SR. The mixture is stirred for 10 minutes and diluted to a solids content of 0.2% with water, after which paper sheets are produced on a laboratory sheet-forming apparatus and the sheets are dried for 5 minutes at 100° C. The resulting sheets are dyed in level orange hues and have good fastness to bleeding with respect to water.

Whe products obtained by milling the dyes from Examples 2 to 65 with amidosulfonic acid are used, similar dyeing results are obtained.

EXAMPLE 68

An absorbent web of unsized paper is drawn, at 40°–50° C., through a dye solution composed of 0.5 part of the dye from Example 1, 0.5 part of starch, 3 parts of acetic acid and 96 parts of water. The excess of dye solution is pressed out between two rollers. The dry paper web is found to be dyed in an orange hue.

I claim:

1. A compound of the formula:

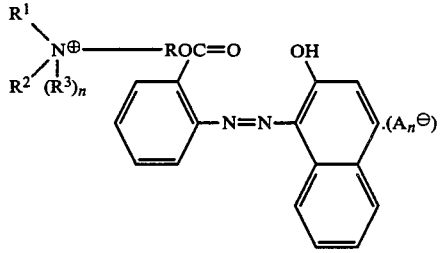

where
n is 0 or 1,
A is an anion,
R is $C_2$- to $C_4$-alkylene
$R^1$ and $R^2$ independently of one another are $C_1$- to $C_4$-alkyl, methoxyethyl, cyclohexyl, and $R^1$ and $R^2$ together are

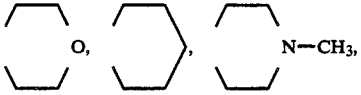

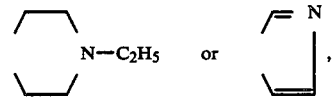

and
$R^3$ is methyl, ethyl or hydroxyethyl.

2. The compound of claim 1, wherein n is 1 and A is selected from the group consisting of chloride, bromide, hydrogen sulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate and dodecylbenzenesulfonate.

3. The compound of claim 1 which is

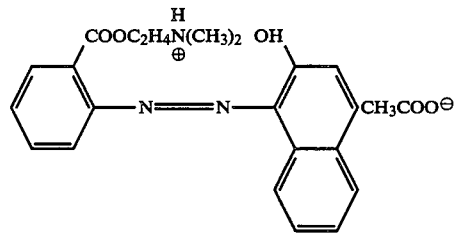

* * * * *